United States Patent [19]
Papenhagen et al.

[11] Patent Number: 5,697,253
[45] Date of Patent: Dec. 16, 1997

[54] MOTION TRANSMISSION ARRANGEMENT FOR CONTROLLING AN INTERNAL COMBUSTION ENGINE

[75] Inventors: Dieter Papenhagen, Waiblingen; Manfred Löchle, Stuttgart, both of Germany

[73] Assignee: Mercedes-Benz AG, Stuttgart, Germany

[21] Appl. No.: 632,956

[22] Filed: Apr. 16, 1996

[30] Foreign Application Priority Data

Apr. 25, 1995 [DE] Germany ............ 195 15 108.9

[51] Int. Cl.⁶ .................................................. G05G 1/00
[52] U.S. Cl. ............................ 74/470; 74/513; 123/400
[58] Field of Search .................... 74/502.4, 502.6, 74/501.5 R, 500.5, 513, 470, 595; 248/900, 548; 123/399, 400, 401

[56] References Cited

U.S. PATENT DOCUMENTS

| | | | |
|---|---|---|---|
| 3,981,207 | 9/1976 | Stant et al. | 74/513 |
| 4,362,138 | 12/1982 | Krueger et al. | 123/400 |
| 4,875,449 | 10/1989 | Kramer et al. | 123/400 |
| 4,971,006 | 11/1990 | Imaeda | 123/400 |
| 4,986,238 | 1/1991 | Terazawa | 123/400 X |
| 5,191,866 | 3/1993 | Tosdale | 74/513 X |
| 5,339,783 | 8/1994 | Teichert | 74/513 X |

*Primary Examiner*—Charles A. Marmor
*Assistant Examiner*—Saul J. Rodriguez
*Attorney, Agent, or Firm*—Klaus J. Bach

[57] ABSTRACT

In a device for the transmission of motion from an accelerator pedal to a power output control element of an internal combustion engine fitted with an automatic power transmission including a motion transfer lever linked to the accelerator pedal, an operating lever is arranged adjacent to the motion transfer lever such that both are pivotable about the same axis and a kick down spring engages the two levers with one another for movement in unison until the operating lever reaches a full load end position beyond which only the motion transfer lever can be moved against the force of the kickdown spring for engagement with an actuating means for initiating shifting of the transmission.

5 Claims, 3 Drawing Sheets

MOTION TRANSMISSION ARRANGEMENT FOR CONTROLLING AN INTERNAL COMBUSTION ENGINE

BACKGROUND OF THE INVENTION

The invention relates to a motion transmission arrangement for controlling an internal combustion engine including an accelerator pedal from which a control motion is transmitted to an engine power output control device.

A motion transmission arrangement of this kind is used in production vehicles of the C class and E class of cars manufactured by the assignee of the present invention. It is arranged between an accelerator pedal and an engine power control element, e.g. a throttle valve.

The accelerator pedal actuates a motion transfer lever via a pull member against the force of a return spring. Generally, the accelerator pedal is operable between an idle position and a full-load position. To control an internal combustion engine with an automatic transmission, movement of the accelerator pedal may be extended beyond its full-load position whereby the transmission is caused to change to the next lower gear. This process is referred to as kickdown, wherein the accelerator pedal is moved against the force of an additional kickdown spring.

The kickdown spring is situated at the free end of the pull member, which is hooked into an angled supporting element on a motion transfer lever, and is supported on a support element. The kickdown spring comes into effect when the transfer lever, which is designed as a slotted lever, rests against a full load stop.

It is the object of the invention to provide a motion transmission arrangement which is relatively small and which is particularly suitable for motion transmission arrangements of an electric pedal position transmitter.

SUMMARY OF THE INVENTION

In an arrangement for the transmission of motion from an accelerator pedal to a power output control element of an internal combustion engine fitted with an automatic power transmission including a motion transfer lever linked to the accelerator pedal, an operating lever is arranged adjacent the motion transfer lever such that both are pivotable about the same axis and a kick down spring engages the two levers with one another for movement in unison until the operating lever reaches a full load end position beyond which only the motion transfer lever can be moved against the force of the kickdown spring for engagement with an actuating means for initiating shifting of the transmission.

Since in the arrangement according to the invention, the kickdown spring and a support element are both integrated into the motion transfer lever, an extremely space saving arrangement is obtained.

The kickdown spring is disposed longitudinally in a guide slot in the motion transfer lever, one end wall of the guide slot serving as a support for the kickdown spring, while the other end wall of the guide slot serves as a support for a motion transfer element. The motion transfer element is held in engagement with the end wall by the kickdown spring only during normal vehicle operation, but remains in a final end position when the accelerator pedal is moved beyond the full load end position since, because of the full load stop, the motion transfer element moves away from the endwall on the supporting element side, while compressing the kickdown spring by a corresponding amount.

The special design and mounting of the motion transfer element prevents its tilting and hence jamming. As a result, the motion transfer element which serves as a coupling member has a direction of movement which coincides with the line of action of the kickdown spring. This provides for smooth operation of the linkage.

An exemplary embodiment of the invention is illustrated in the drawings and explained in greater detail below with reference to the drawings.

DESCRIPTION OF A PREFERRED EMBODIMENT

Figure 1:
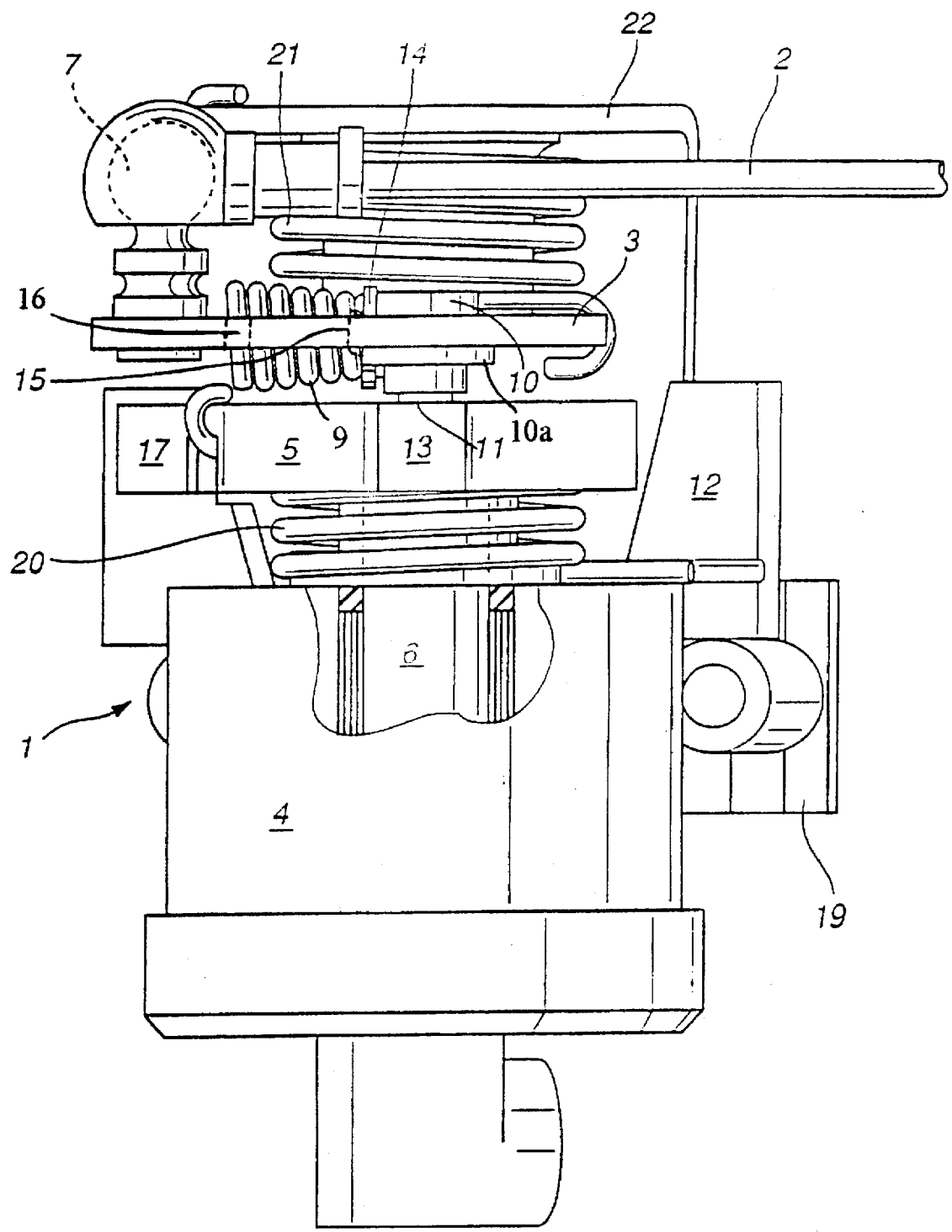
FIG. 1 is an elevational view of the motion transmission arrangement.
Figure 2:
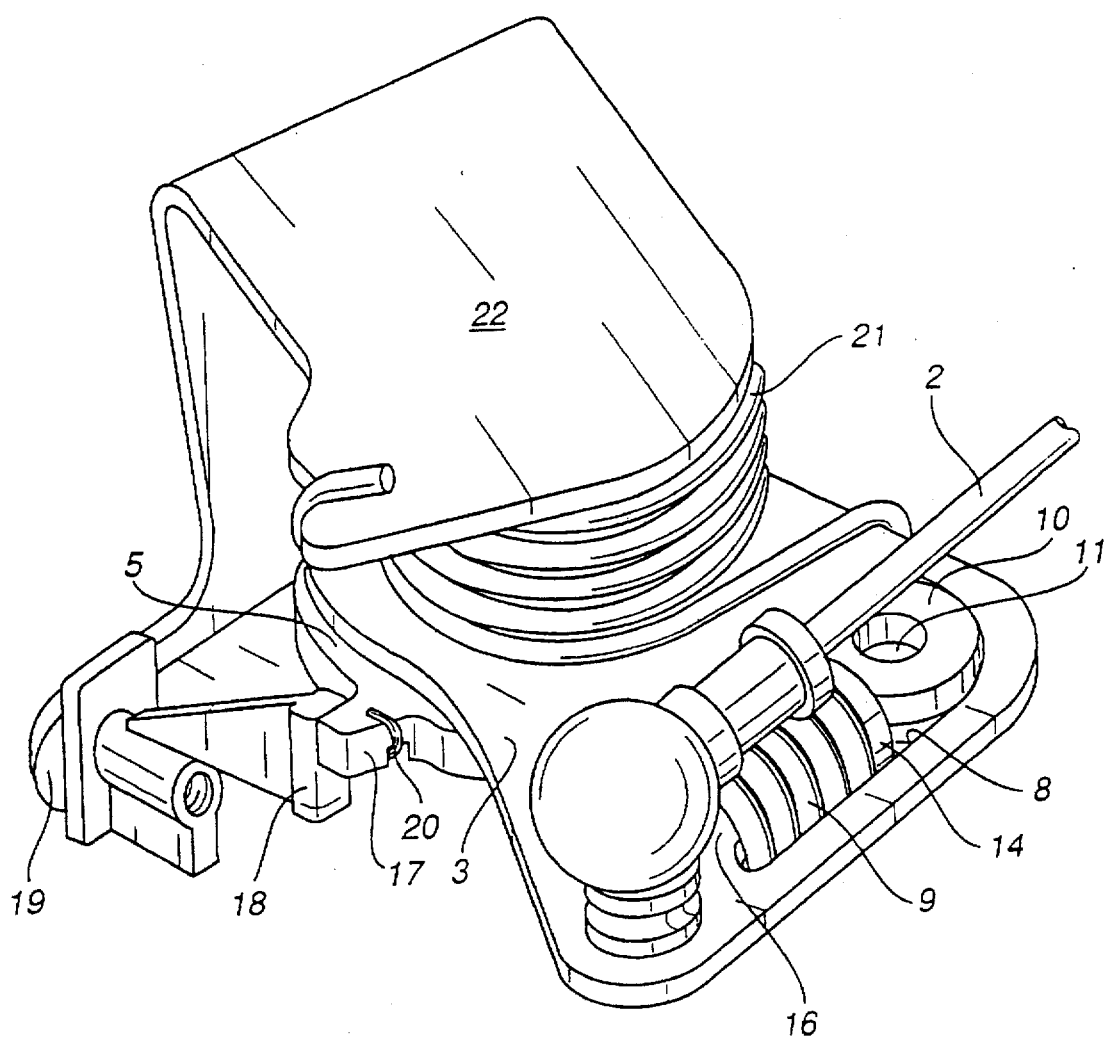
FIG. 2 is a perspective view of the motion transmission arrangement according to the invention with a kickdown spring, and, FIG. 3 shows a prior art transmission arrangement.

Arranged between an accelerator pedal (not shown specifically) and an engine power control element, e.g. a throttle valve, is a motion transmission device 1 for the transmission of control movement of the accelerator pedal. The accelerator pedal motion is transmitted via a pull member 2 to a rotatably mounted motion transfer levee 3, a pedal position transmitter and, finally, to the power control element of an internal combustion engine.

Between the motion transfer lever 3 and a pedal position sensor and transmitter housing 4, there is an operating lever 5 which is firmly mounted on a drive shaft 6 projecting from the transmitter housing 4.

The motion transfer lever 3 is arranged coaxially with respect to the operating lever 5 and carries at one end thereof a spherical head 7 onto which the pull member 2 is mounted. The motion transfer lever 3 has a retaining slot 8, which extends in the direction of rotation of the motion transfer lever 3 and receives a preloaded kickdown spring 9 and a motion transfer element 10. The motion transfer element 10 and the spring 9 serve as a coupling structure between the spherical head 7, that is, the motion transfer lever 3 and the operating lever 5.

The motion transfer element 10 is a sleeve which is mounted on a bearing journal 11 extending from a radial projection 13 of the disc-shaped operating lever 5, the projection interacting with a full load stop 12 for the operating lever 5. The sleeve 10 has a sliding disc portion 10a on which the motion transfer lever 3 is disposed and, transversely to the longitudinal axis of said disc, a spring support plate 14 with a guide projection 15 for the kickdown spring 9.

For engagement with the spring 9, a nose 16 extends into the retaining slot 8 by which the kickdown spring 9 is secured in position within the retaining slot 8. The preloaded kickdown spring 9 presses the motion transfer element 10 toward the motion transfer element end of the retaining slot 8, such that, when the accelerator pedal is actuated, the operating lever 5 is also rotated as the motion of the motion transfer lever 3 is transferred to the operating lever 5 as long as the accelerator pedal is within a range between its minimum load and full load positions.

If, on the other hand, there is control movement of the accelerator pedal beyond the full load stop 12, where further movement of the operating lever 5 is prevented, the motion transfer lever 3 is decoupled from the operating lever 5 which remains rested against the full load stop 12. Then the motion transfer lever 3 is further rotated against the force of the kickdown spring 9 which motion is transmitted to the transmission causing shift down to the next lower transmission ratio.

The excess motion of the motion transfer lever 3 is transmitted to the transmission in a known manner by way of a linkage or by actuation of a switch whereby a signal is transmitted to the transmission.

A projection 17 on the operating lever 5 serves as a minimum load or idle stop 18 for the operating lever 5.

The full load stop 12 and the idle stop 18 are structures extending from a support bracket 19 provided for supporting the pedal position transmitter housing.

The motion transmission device 1 furthermore has coaxially arranged return springs 20, 21 in the form of coil springs, of which the coil spring 20 located between the pedal position transmitter housing 4 and the operating lever 5 is connected, at one end, to the transmitter housing and, at the other end, to the operating lever 5. The coil spring 21 arranged between the motion transfer lever 3 and a roof-shaped holding plate 22 of the support bracket 19 is connected, at one end, to the motion transfer lever 3, and, at the other end, to support the bracket 19.

Figure 3:
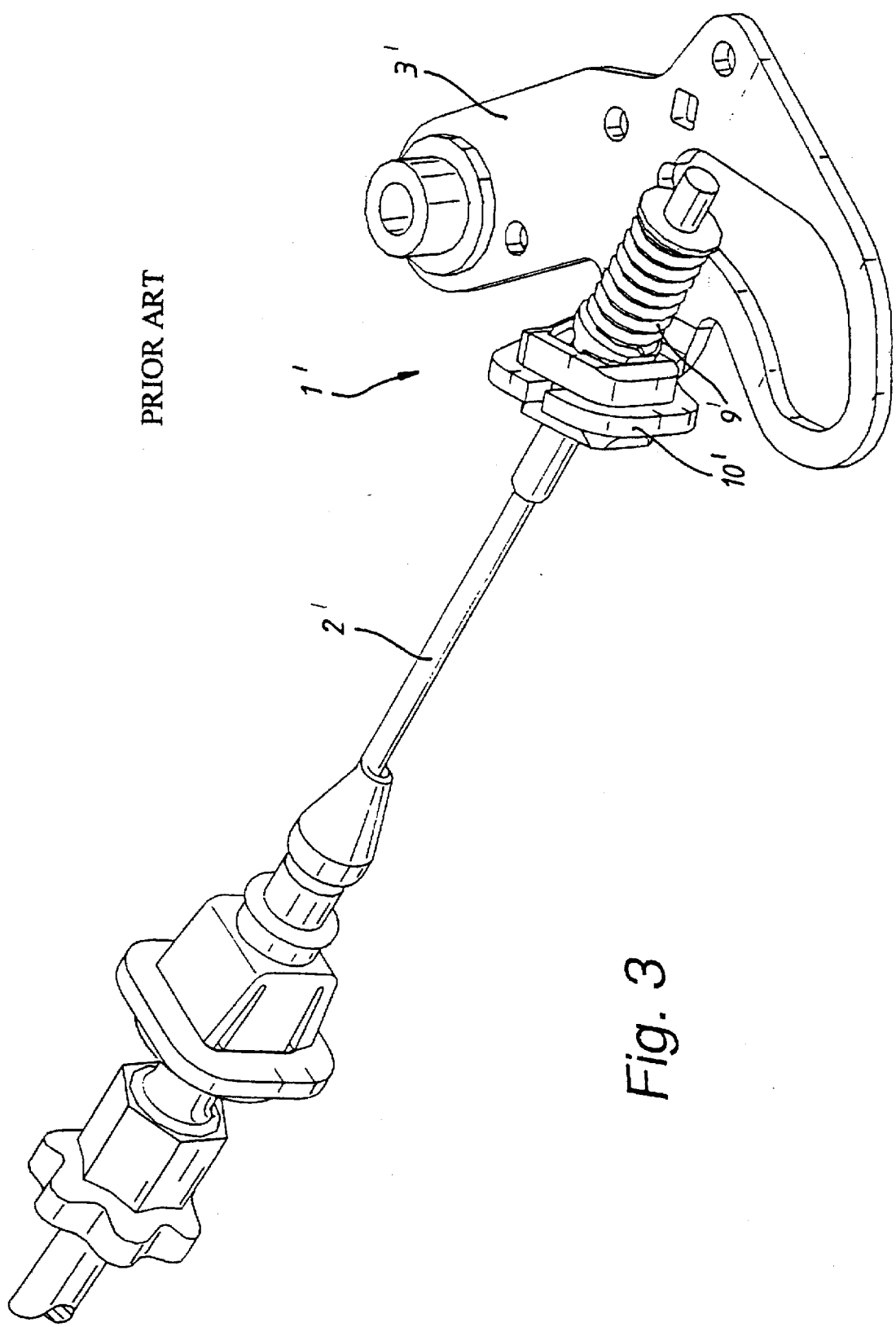

For comparison, FIG. 3 shows a prior art motion transmission device 1' in which a supporting element 10' bent out from a slotted motion transfer lever 3' is provided for the insertion of a pull member 2' connected to the accelerator pedal and, at the same time, to act as a support for a kickdown spring 9' arranged at the free end of the pull member 2'.

What is claimed is:

1. A motion transmission arrangement for the transmission of motion from an accelerator pedal to a power output control element of an internal combustion engine fitted with an automatic power transmission, comprising: a motion transfer lever supported so as to be rotatable about a given axis for actuation by said accelerator pedal, an operating lever supported adjacent said motion transfer lever so as to be pivotable about said given axis between an engine idle position and an engine full power position, said motion transfer lever having a slot formed therein at a distance from said axis and extending in the direction of pivot movement of said motion transfer lever about said axis, a motion transfer element mounted on said operating lever and extending into said slot and a kickdown spring normally holding said operating lever in engagement with said motion transfer lever at one end of said slot for movement therewith between said idle position and said full load position of said operating lever, said motion transfer lever being pivotable beyond the full load end position of said operating lever against the force of said kickdown spring for causing, upon movement of the motion transfer lever beyond the full load position of said operating lever, a shift-down of the engine transmission.

2. An arrangement according to claim 1, wherein said motion transfer element is mounted on a bearing journal projecting from said operating lever into said slot and said kickdown spring is a coil spring disposed in said slot and engaging said motion transfer element.

3. A arrangement according to claim 2, wherein said motion transfer element is a sleeve disposed around said bearing journal and a spring support plate is arranged between said sleeve and said coil spring, said spring support plate having a guide projection extending into said kick down spring.

4. A arrangement according to claim 1, wherein a spherical coupling head is mounted on said motion transfer lever for receiving a link to transmit accelerator pedal motion to said motion transfer lever.

5. A arrangement according to claim 1, wherein said operating lever has the form of a disc which has two radial projections, one for engagement with an idle stop defining the idle position of said operating lever and the other for engagement with a full load stop defining the full load position of said operating lever.

* * * * *